(12) United States Patent  
Fujimoto et al.

(10) Patent No.: US 7,753,187 B2  
(45) Date of Patent: Jul. 13, 2010

(54) LOCKING TRANSMISSION FOR A VEHICLE, AND VEHICLE INCLUDING SAME

(75) Inventors: Yasushi Fujimoto, Saitama (JP); Katsuhiko Ito, Saitama (JP); Kinya Mizuno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 648 days.

(21) Appl. No.: 11/651,423

(22) Filed: Jan. 9, 2007

(65) Prior Publication Data

US 2007/0158161 A1 Jul. 12, 2007

(30) Foreign Application Priority Data

Jan. 11, 2006 (JP) ............................. 2006-004091

(51) Int. Cl.  
*B60T 1/06* (2006.01)  
*B60W 10/10* (2006.01)  
(52) U.S. Cl. ................. 192/219.5; 74/337.5; 192/219.4  
(58) Field of Classification Search ............. 192/219.4, 192/219.5  
See application file for complete search history.

(56) References Cited

U.S. PATENT DOCUMENTS 5,649,457 A * 7/1997 Kudou et al. .............. 74/577 R  
6,691,815 B2 * 2/2004 Rioux et al. ................ 180/292  
6,725,962 B1 * 4/2004 Fukuda ..................... 192/219.5  
6,978,857 B2 * 12/2005 Korenjak .................... 180/292

FOREIGN PATENT DOCUMENTS

JP 2004-353739 12/2004

* cited by examiner

*Primary Examiner*—Rodney H Bonck  
(74) *Attorney, Agent, or Firm*—Carrier, Blackman & Associates P.C.; William D. Blackman; Joseph P. Carrier

(57) ABSTRACT

A transmission for an internal combustion apparatus is provided in which a parking lock mechanism is commonly formed with an upstream side portion of a power transmission system of a shift change mechanism, whereby the number of parts is reduced and the parking lock mechanism is compactly incorporated therein to achieve miniaturization of the internal combustion engine. The transmission in which a shift change mechanism performs a shift change in response to an operation of a gear selecting apparatus is configured to include a parking lock mechanism which is driven in an interlocking relationship with a working portion of the shift change mechanism, and if the shift change mechanism is set to the parking position, then a rotary shaft of the transmission is locked against rotation by the parking lock mechanism thereby restricting rotation of the rotary shaft.

18 Claims, 8 Drawing Sheets

LOCKING TRANSMISSION FOR A VEHICLE, AND VEHICLE INCLUDING SAME

CROSS-REFERENCE TO RELATED APPLICATIONS

The present invention claims priority under 35 USC 119 based on Japanese patent application No. 2006-004091, filed on Jan. 11, 2006. The subject matter of this priority document is incorporated by reference herein.

BACKGROUND OF THE INVENTION

1. Field of the Invention

The present invention relates to a transmission for use with an internal combustion engine, in which the transmission includes a parking lock mechanism, and to a vehicle including the locking transmission.

2. Description of the Background Art

Various examples of transmissions for internal combustion engines have been proposed, in which a parking position of the transmission can be selected in response to an operation of a shift lever, and in which the transmission includes a parking lock mechanism for restricting rotation of a drive shaft. Such restriction takes place when the vehicle is stopped, the parking position is selected, and then the internal combustion engine is stopped.

One example of a known transmission including such a parking lock mechanism is disclosed in Japanese Laid-Open Patent No. 2004-353739. In the transmission described in this reference, a parking actuator, that is separate from a gear shift actuator, is controlled and driven by a control device to activate the parking lock mechanism.

As an embodiment in Japanese Laid-Open Patent No. 2004-353739, a configuration is disclosed wherein, if an electric motor which forms a parking actuator is driven, an engaging member is caused to project through a pinion-rack mechanism and a coil spring, whereupon a tooth at an end of the engaging member is engaged with a parking gear fitted on an input power shaft of a speed change gear. As a result, rotation of the input power shaft is restricted.

Since the conventional parking lock mechanism is configured such that a power transmission system is formed as an independent apparatus which is separate from a shift change mechanism, and is driven by an actuator provided for exclusive use by the independent apparatus, it includes a great number of parts and increases the size of the internal combustion engine.

The present invention has been made in view of the above described situation, and it is an object of the present invention to provide a transmission for use with an internal combustion engine, wherein a parking lock mechanism is formed commonly with an upstream side portion of a power transmission system of a shift change mechanism, to reduce the number of parts required, and which can be incorporated compactly in the shift change mechanism to reduce the size of the internal combustion engine.

SUMMARY

In order to achieve the object described above, in a first aspect of the invention, a transmission is provided for use with an internal combustion engine in which a shift change mechanism is operable to perform a shift change, including movement to a parking position, in response to an operation of a gear selection device. The transmission includes a parking lock mechanism that is driven in an interlocking relationship with a working portion of the shift change mechanism, and is configured such that if the shift change mechanism is set to the parking position, then a rotary shaft of the transmission is locked against rotation by the parking lock mechanism. As a result, rotation of the rotary shaft is restricted.

According to the first aspect of the invention, the parking lock mechanism is driven in an interlocking relationship with the working portion of the shift change mechanism. Therefore, the parking lock mechanism is commonly formed with an upstream side portion of a power transmission system of the shift change mechanism, and is driven making use of an operation means of the shift change mechanism, actuator and so forth as well as the working portion. Consequently, the parking lock mechanism is compactly incorporated in the shift change mechanism without requiring operation means, an actuator and so forth dedicated for exclusive use for parking gear locking. Consequently, the overall size of the internal combustion engine is reduced.

Further, if the shift change mechanism is set to the parking position, then the rotary shaft of the transmission is locked by the parking lock mechanism, thereby restricting rotation of the rotary shaft. Consequently, the operation thereof is simplified and convenient, and the operability is good.

In a second aspect of the invention, the transmission for an internal combustion engine according to the first aspect thereof is further configured such that the parking lock mechanism includes a locking member. The locking member is driven in an interlocking relationship with the working portion of the shift change mechanism, and has a pawl portion which is engaged with a locking portion provided integrally on an output power shaft, which is the rotary shaft of the transmission. As a result, rotation of the output power shaft is restricted.

According to the second aspect of the invention, the pawl portion of the locking member is driven in an interlocking relationship with the working portion of the shift change mechanism. In addition, the pawl portion is engaged with the locking portion provided integrally on the output power shaft of the transmission, thereby restricting rotation of the output power shaft. Consequently, rotation of the output power shaft is restricted with certainty with a simple configuration.

In a third aspect of the invention, the transmission for an internal combustion engine according to the first or second aspects hereof is configured such that the shift change mechanism includes a gear shift arm, fitted with a shift spindle, and a shift drum which meshes with and is rotated by the gear shift arm to perform the shift change. The shift spindle is the working portion which is rotated by the operation of the operation selection device. In addition, the parking lock mechanism is driven in an interlocking relationship with the rotation of the shift spindle to lock the output power shaft which is the rotary shaft. In addition, the gear shift arm forms a sectoral shape having a pivot at the shift spindle, while the output power shaft is disposed outside a range of pivotal motion of the gear shift arm within a maximum diameter of the pivotal motion of the gear shift arm.

According to the third aspect of the invention, the output power shaft is disposed at a position which is outside the range of pivotal motion of the sectoral gear shift arm which pivots around the shift spindle, and the output power shaft is further disposed so as to overlap with a circle of the maximum diameter of the pivotal motion. Therefore, the shift spindle is positioned in the proximity of the output power shaft, and the parking lock mechanism is compactly incorporated.

In a fourth aspect of the invention, the transmission for an internal combustion engine according to the second or third aspects thereof is configured such that the locking member of the parking lock mechanism is a lever supported for rocking motion on a fixed support shaft, and has a fulcrum and a point of action at the fixed support shaft and the pawl portion, respectively. In addition, the distance of a power point of the lever from the fulcrum is set to be greater than the distance of the pawl portion, which is the point of action, from the fulcrum.

According to the fourth aspect of the invention, the distance of the power point of the lever, which is a locking member from the fulcrum, is set greater than the distance of the pawl portion, which is the point of action, from the fulcrum. Therefore, by the principle of the lever, even where the parking lock mechanism is small in size, engagement and disengagement of the pawl portion with and from the locking portion of the output power shaft can be performed smoothly with doubled force.

In a fifth aspect of the invention, the transmission for an internal combustion engine according to the third or fourth aspects thereof is configured such that the shift spindle, a drum shaft of the shift drum and the output power shaft are disposed in a mutually neighboring relationship so as to form vertices of a triangle when viewed from the rear.

According to the fifth aspect of the invention, since the shift spindle, the drum shaft of the shift drum and the output power shaft are disposed in a mutually neighboring relationship so as to form the vertices of a triangle, the shift change mechanism is compactly configured.

In a sixth aspect of the invention, the transmission for an internal combustion engine according to any one of the third to fifth aspects thereof is configured such that an end portion of the shift spindle is formed as a separate removable member, and the parking lock mechanism is connected to the end portion of the shift spindle so as to be interlocked with the shift spindle.

According to the sixth aspect of the invention, the end portion of the shift spindle is formed as a separate removable member, and the parking lock mechanism is connected to the end portion of the shift spindle so as to be interlocked with the shift spindle. Therefore, by connecting the parking lock mechanism to the end portion so as to form a unit, the assemblage performance is enhanced.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
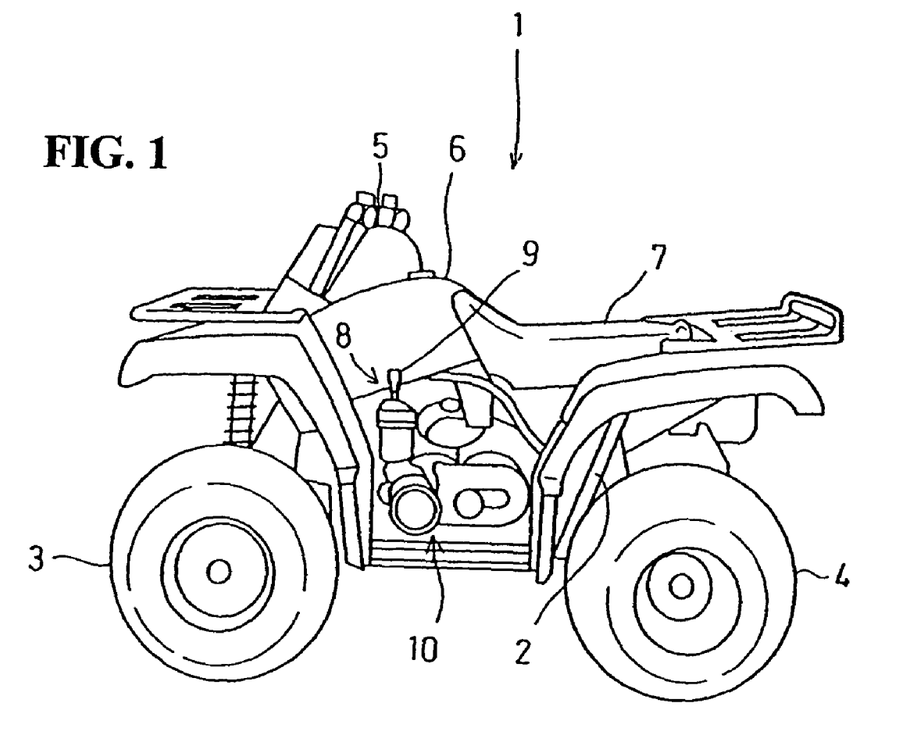
FIG. 1 is a side elevational view of an entire four-wheel saddle type vehicle on which an internal combustion engine including a transmission according to an embodiment of the present invention is carried.

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. Directional descriptions are provided with respect to the point of view of an operator of the vehicle. For example, a disclosure of "forward" refers to the forward operating direction of the vehicle A four-wheel, saddle type all-terrain vehicle (ATV) 1 for traveling on rough or irregular ground, and which incorporates an internal combustion engine including a transmission according to the present embodiment, is shown in FIG. 1.

The vehicle 1 includes a vehicle body frame 2, with a pair of front wheels 3, 3 disposed on opposite sides of a front portion of the vehicle body frame. A pair of rear wheels 4, 4 are disposed on opposite sides of a rear portion of the vehicle body frame 2, and all of the front and rear wheels cooperate to support a vehicle body. A steering handlebar 5 is provided at an upper front portion of the vehicle body, for use in steering the front wheels 3, 3. A fuel tank 6 is disposed in back of the steering handlebar 5, and a seat 7 is provided behind the fuel tank 6.

An internal combustion engine 10 is mounted on the vehicle body frame 2 at a central portion of the vehicle body. A transmission gear selecting apparatus 8 is disposed on the left side of the fuel tank 6 above a left side portion of the internal combustion engine 10.

Figure 2:
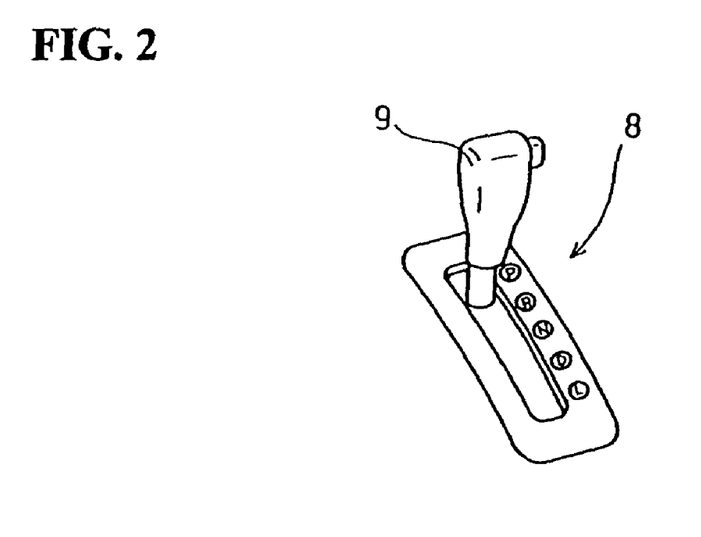
FIG. 2 is a perspective view of a transmission gear selecting apparatus.

The gear selecting apparatus 8 is formed such that a shift lever 9 is pivoted forwardly or backwardly to perform a shift changing operation, as seen in FIG. 2. A parking position P, a reverse position R, a neutral position N, a drive position D and a low position L are indicated in conventional order along the pivoting motion of the shift lever 9.

The shift lever 9 is configured to pivot only in the forward and backward direction, and is operated forwardly or backwardly by a driver so as to be selectively positioned to a required position to perform a shift change. The parking position P is positioned most forwardly (FIG. 2). The pivoting motion of the shift lever 9 is transmitted to the transmission through a cable (not shown).

The internal combustion engine 10 is supported at a central portion of the vehicle body, and is a water-cooled single-cylinder four-stroke cycle internal combustion engine. The engine 10 is carried vertically with a crankshaft 11 thereof directed forwardly and backwardly such that power of the engine 10 is transmitted to the four wheels 3, 4.

Figure 3:
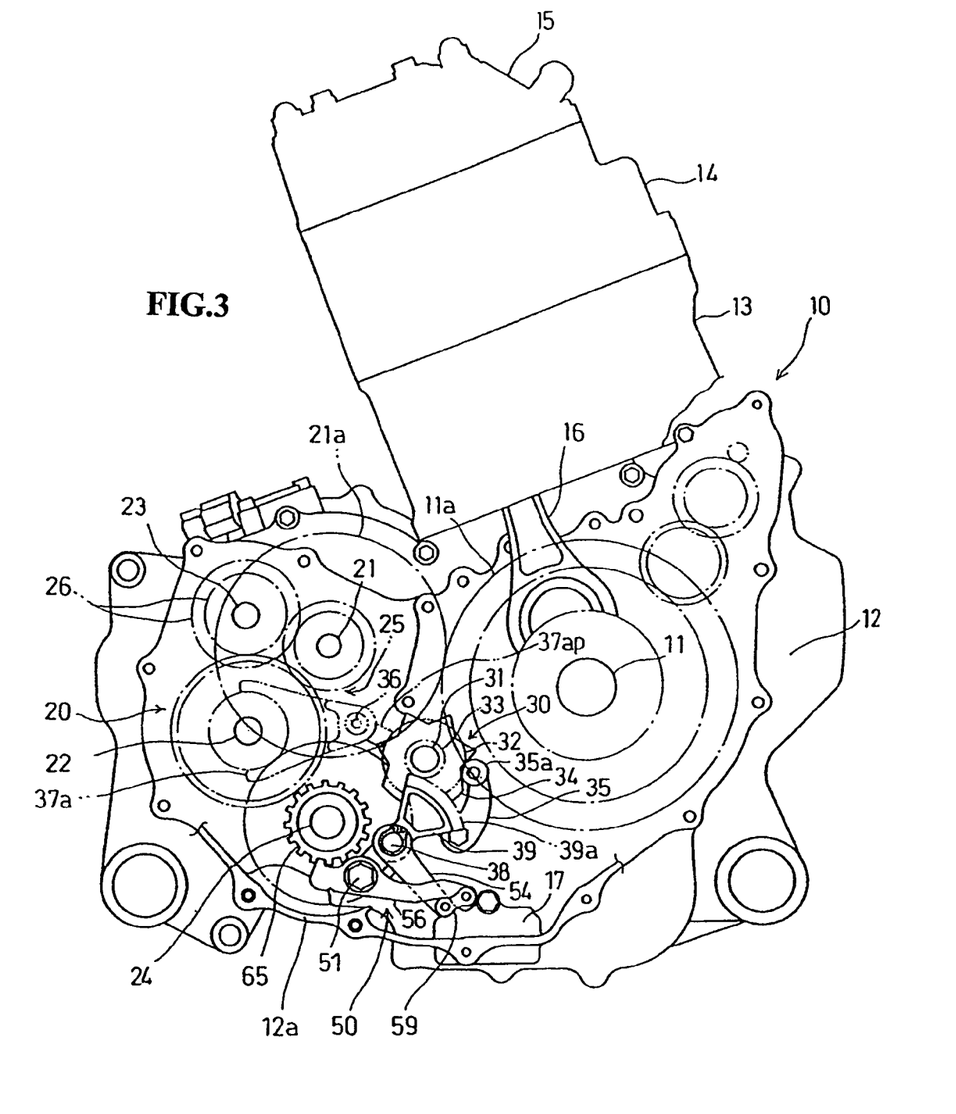
FIG. 3 is a schematic rear elevational view of the internal combustion engine of FIG. 1, showing the output power shaft disposed leftward and below the crankshaft, and showing the shift drum disposed between the output power shaft and the crankshaft.

FIG. 3 is a schematic rear elevational view of the internal combustion engine 10.

The internal combustion engine 10 includes an engine body which is formed from a cylinder 13 in which a piston is fitted for reciprocating movement, a cylinder head 14 and a head cover 15 placed, in order, on the cylinder 13 and coupled to each other, and a crankcase 12 coupled to a rear end portion of the cylinder 13.

The crankcase 12 is a case divided into front and rear members, and the crankshaft 11 is supported for rotation on the front and rear crankcase 12 members and connected to the piston through a connecting rod 16 such that reciprocating movement of the piston is converted into and transmitted as rotation of the crankshaft 11. A transmission 20 is disposed on the left side of the crankcase 12.

A main shaft 21 is disposed leftwardly of the crankshaft 11 at a substantially equal height therewith. A counter shaft 22 is disposed obliquely downwardly on the left side of the main shaft 21 while a reverse shaft 23 is disposed above the counter shaft 22. An output power shaft 24 is disposed obliquely downwardly of the counter shaft 22 and substantially just below the main shaft 21.

A driving gear wheel 11a connected to the crankshaft 11 through a start clutch is held in meshing engagement with a driven gear wheel 21a of the main shaft 21, and a speed change gear train group 25 is formed between the main shaft 21 and the counter shaft 22. Upon reversal, reverse gears 26 of the reverse shaft 23 are interposed between the main shaft 21 and the counter shaft 22.

A shift drum shaft 31 is disposed rightwardly of the counter shaft 22 and rightwardly upwards of the output power shaft 24. The shift drum shaft 31 integrally supports a shift drum 32 thereon. Two shift forks 37a and 37b are supported for pivotal motion on a guide shaft 36 disposed between the shift drum shaft 31 and the counter shaft 22.

Figure 5:
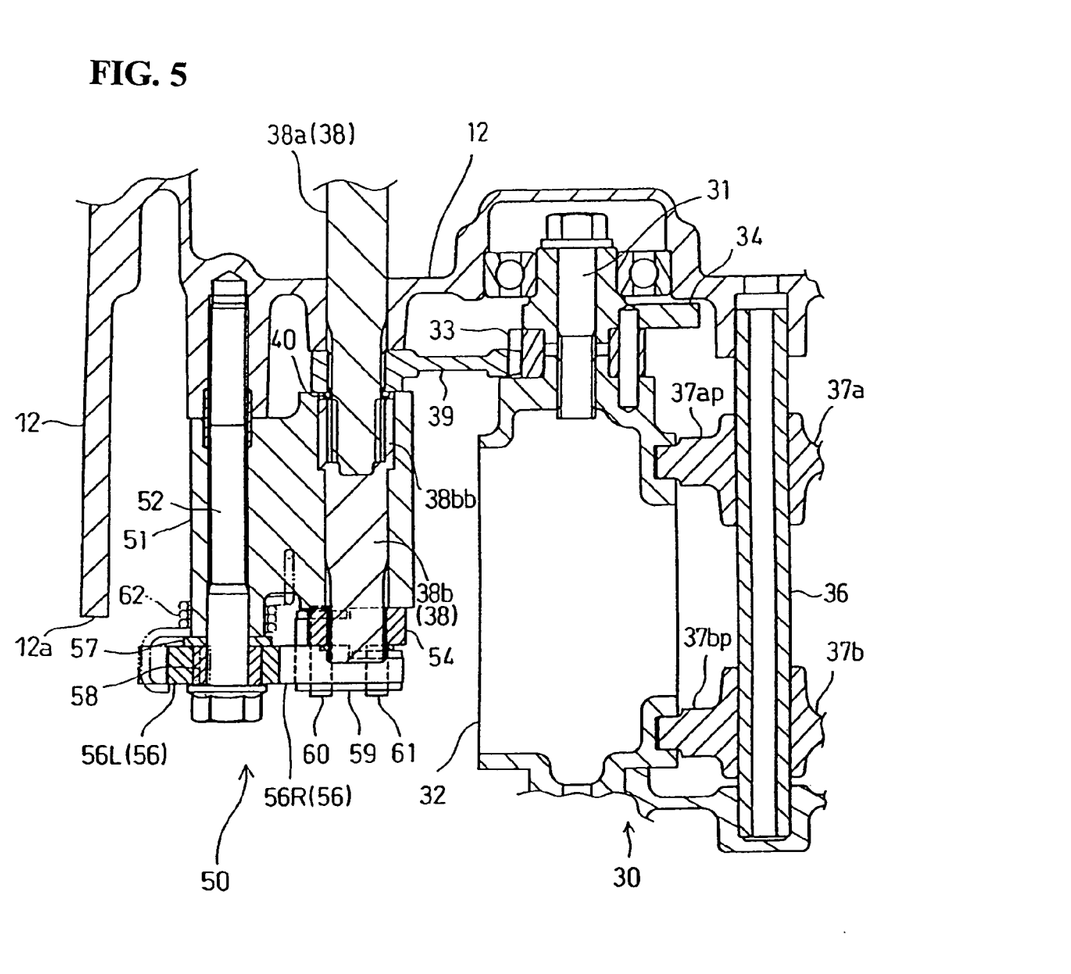
FIG. 5 is a sectional view of the inventive shift change mechanism and a parking lock mechanism taken along line V-V of FIG. 4.
Figure 7:
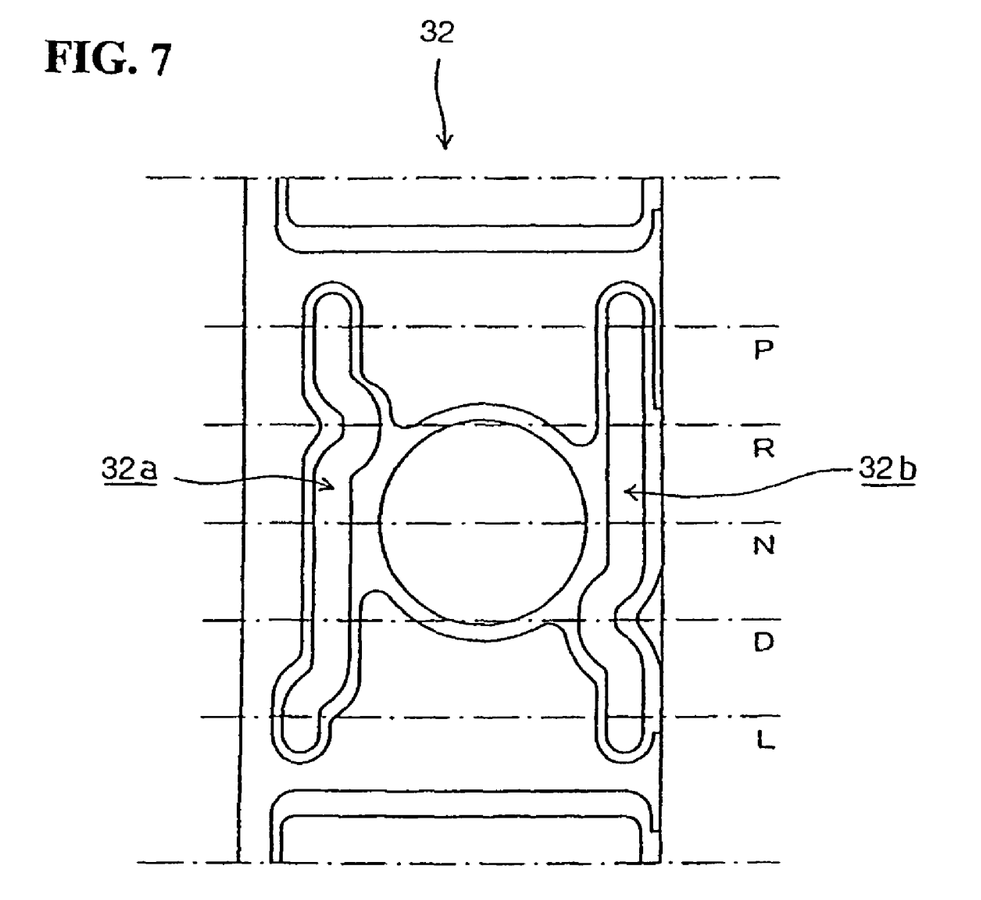
FIG. 7 is a developed view of a shift drum.

The shift forks 37a and 37b engage at ends thereof with a sliding member fitted on the counter shaft 22, and shift pins 37ap and 37bp projecting from base end portions of the shift forks 37a and 37b are fitted in shift grooves 32a and 32b formed on an outer circumferential face of the shift drum 32 (refer to FIGS. 5 and 7).

As seen in FIG. 7 which is a developed view of the shift drum 32, the two shift grooves 32a and 32b are formed on the outer circumferential face of the shift drum 32, and a parking position P, a reverse position R, a neutral position N, a drive position D and a low position L are provided in the order of the angle of rotation of the shift drum 32.

Although the parking position P and the neutral position N are same in the axial direction of the shift forks 37a and 37b, since the reverse position R at which the shift groove 32a is curved is disposed between the parking position P and the neutral position N, such a situation that the shift forks 37a and 37b enter the parking position P from the neutral position N although the shift lever 9 is not operated is prevented without increasing the size of the shift drum 32.

Referring to FIG. 3, an oil strainer 17 is provided along the bottom face of the rear crankcase 12 member and is formed on the inner side (front side) with respect to a mating face 12a of the rear crankcase 12 member with a rear crankcase cover (not shown).

Figure 4:
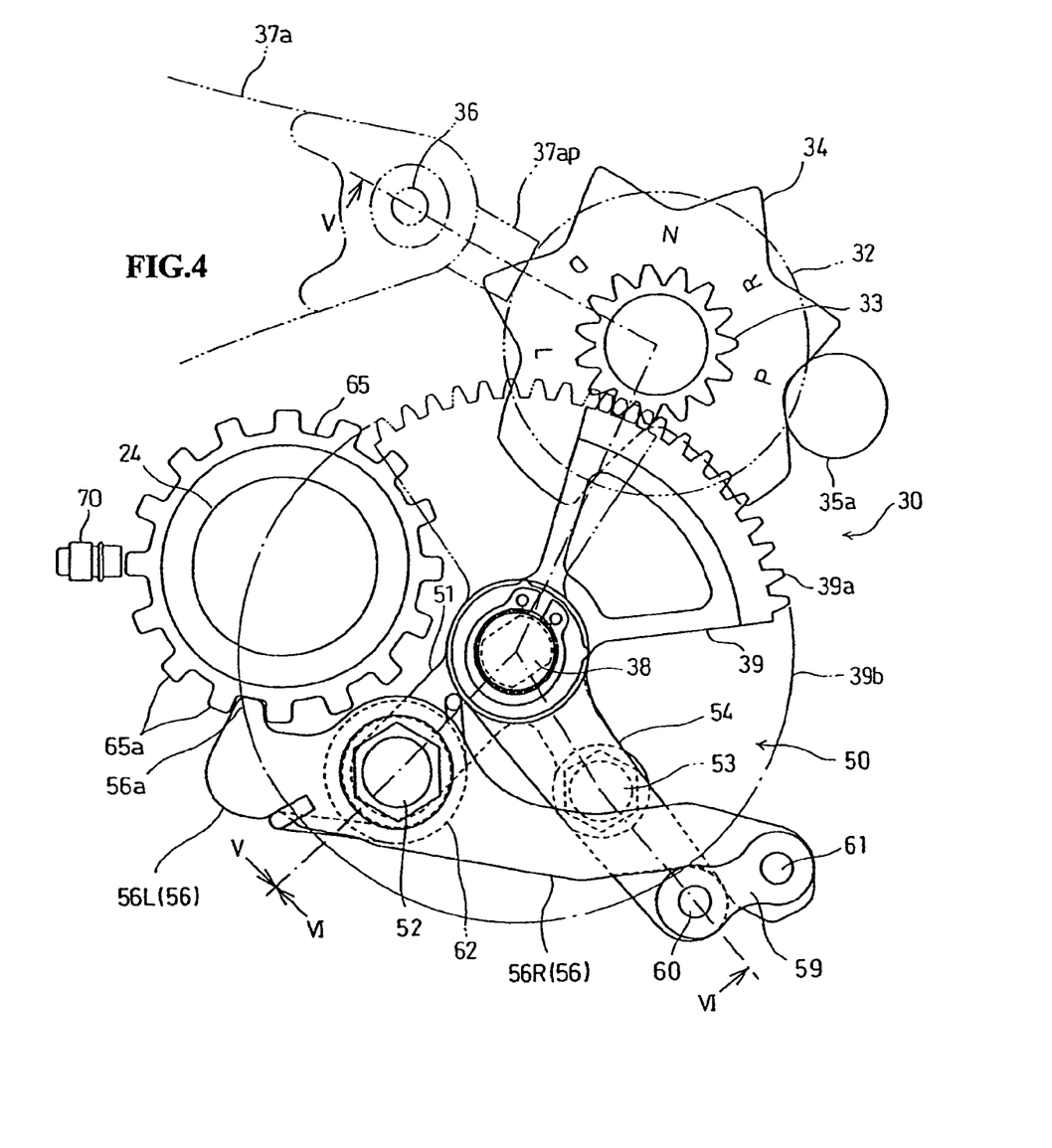
FIG. 4 is a rear elevational view of the inventive shift change mechanism and a parking lock mechanism, showing the pawl engaged with the teeth of the parking gear wheel when the transmission is set to a parking position.

It is to be noted that a drum driven gear wheel 33 and a shift cam 34 are fitted integrally on the shift drum shaft 31 as seen in FIGS. 4 and 5. The shift cam 34 is in the form of a star-shaped plate and has trough portions of a predetermined shape formed on an outer periphery thereof in order in the counterclockwise direction for the parking position P, reverse position R, neutral position N, drive position D and low position L. When a stopper roller 35a supported for rotation at an end of a stopper arm 35 biased in one pivotal direction is pressed against the outer periphery of the shift cam 34, the stopper roller 35a can be received stably by any of the troughs at the positions thereby to set the shift drum 32 to a predetermined angular position.

A shift spindle 38 is disposed at a position below the shift drum shaft 31 and rightwardly of the output power shaft 24, and a gear shift arm 39 is provided and fitted at a base end portion thereof with the shift spindle 38. The gear shift arm 39 has a sectoral shape having a pivot at the shift spindle 38, and a shift driving gear 39a is formed along an end edge of the developed sectoral shape of the gear shift arm 39. The shift driving gear 39a is held in meshing engagement with the drum driven gear wheel 33 fitted on the shift drum shaft 31.

Since the output power shaft 24 is positioned on the left side position of the sectoral gear shift arm 39 outside the range of pivotal motion of the gear shift arm 39, the output power shaft 24 and the shift spindle 38 are positioned near to each other. In particular, referring to FIG. 4, the output power shaft 24 is disposed at a position overlapping with a circle 39b of a maximum diameter of pivotal motion of the sectoral gear shift arm 39 which is pivoted around the shift spindle 38 (distance from the shift spindle 38 to a pivotal end edge of the gear shift arm 39).

The shift spindle 38 extends at a front end thereof through the crankcase 12 and a front cover (not shown) of the internal combustion engine 10 and projects forwardly, and motion instruction transmission means such as a cable extending from the shift lever 9 is coupled to a front end portion of the shift spindle 38 so that the shift spindle 38 is rotated by a pivoting movement of the shift lever 9.

In a shift change mechanism 30 is formed in such a manner as described above, and when the shift spindle 38 is rotated by an operation of the shift lever 9, the sectoral gear shift arm 39 is pivoted, whereupon the shift drum shaft 31 is rotated together with the shift drum 32 through the meshing engagement between the shift driving gear 39a and the drum driven gear wheel 33. Then, the shift forks 37a and 37b are moved in an axial direction under the guidance of the shift grooves 32a and 32b of the rotated shift drum 32 to slidably move the sliding member of the counter shaft 22 thereby to change meshing gear wheels of the speed change gear train group 25 to perform a shift change.

When the shift lever 9 is moved to the forwardmost position, it is placed into the parking position P, and as the shift lever 9 is pivoted rearwardly from the parking position P, it successively assumes the reverse position R, neutral position N, drive position D and low position L.

By such rearward pivoting movement of the shift lever 9, the shift spindle 38 is rotated in the counterclockwise direction in FIG. 3 via the cable and so forth, and the shift drum shaft 31 is rotated in the clockwise direction through the meshing engagement between the shift driving gear 39a and the drum driven gear wheel 33. Thereupon, the stopper roller 35a is successively fitted into the troughs formed on the outer periphery of the shift cam 34 to successively set the shift drum 32 to a predetermined angular position. Consequently, the meshing engagement of the speed change gear train group 25 can be successively shifted and changed to the parking position P, reverse position R, neutral position N, drive position D and low position L.

According to the present transmission 20, a parking lock mechanism 50 is incorporated in the shift change mechanism 30 described above.

The shift spindle 38 is formed at a rear end portion thereof from a rear end spindle 38b of a separate member, and serrations formed on an inner circumferential face of a connecting cylindrical portion 38bb of the rear end spindle 38b mesh with serrations formed on an outer circumferential face of a rear portion of a body spindle 38a so that the body spindle 38a and the rear end spindle 38b can rotate coaxially and integrally with each other.

The body spindle 38a extends through and projects rearwardly from the rear side crankcase 12 member, and the gear shift arm 39 is serration fitted at a rear end portion thereof with the serrations of the projecting portion of the body spindle 38a and is prevented from being pulled off by a stop ring 40. The rear end spindle 38b is serration fitted removably with a further tip end portion of the body spindle 38a.

The rear end spindle 38b is supported for rotation on a parking lock holder 51. The parking lock holder 51 is securely mounted on the crankcase 12 by means of a first bolt 52 and a second bolt 53 (refer to FIG. 6). The parking lock holder 51 is assembled to the inner side (front side) with respect to the mating face 12a of the crankcase 12 with the rear crankcase cover (not shown). The rear end spindle 38b extends at an end thereof through and projects rearwardly from the parking lock holder 51, and a driving arm 54 is fitted, at a base end portion thereof, to the end of the rear end spindle 38b, and is prevented from being pulled off by a stop ring 55. The driving arm 54 is located on the end of the rear end spindle 38b at an axial position thereof that substantially aligns with the mating face 12a of the crankcase 12.

The first bolt 52 for securely mounting the parking lock holder 51 on the rear side crankcase 12 member is disposed at a position considerably near to and rightwardly obliquely downwardly of the output power shaft 24. The first bolt 52 secures the parking lock holder 51 while it supports a parking locking lever 56 for rocking motion.

Figure 6:
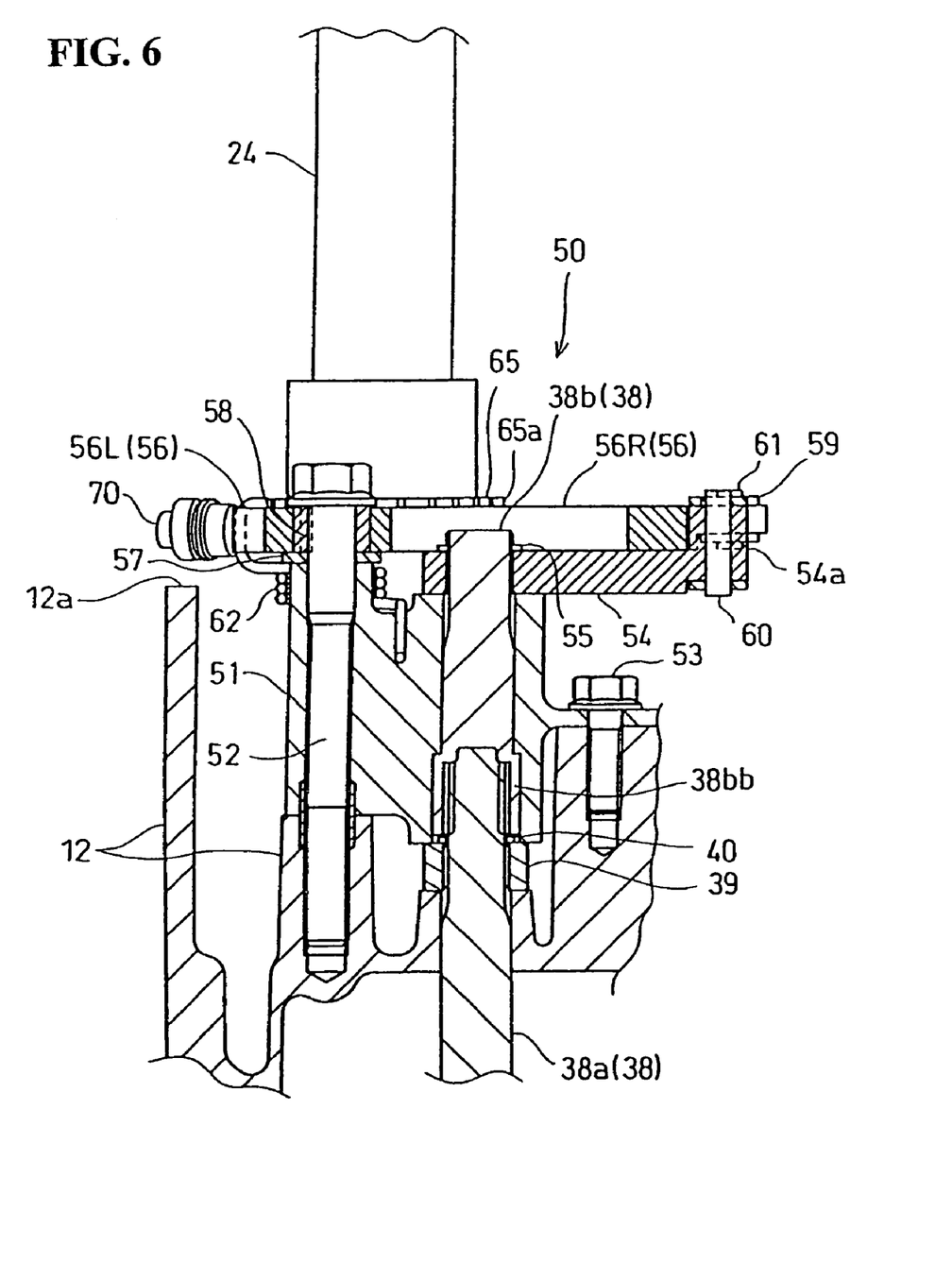
FIG. 6 is a sectional view of the inventive shift change mechanism and a parking lock mechanism taken along line VI-VI of FIG. 4.

In particular, as seen in FIG. 6, a washer 57 and a sleeve 58, on which the parking locking lever 56 is fitted for rocking motion, are provided at an open end of a through-hole of the parking lock holder 51 for the first bolt 52, and the first bolt 52 extends through the washer 57 and the sleeve 58 and further through the through-hole of the parking lock holder 51. Further, the parking lock holder 51 is screwed in and fastened to the crankcase 12, and the parking locking lever 56 is supported for rocking motion on the first bolt 52 via the sleeve 58.

The parking locking lever 56 extends leftwardly and rightwardly from the first bolt 52, and the right side extension 56R is elongated and is connected at the right end thereof to the driving arm 54 through a link member 59. The parking locking lever 56 is positioned rearwardly of the driving arm 54 and crosses the driving arm 54 such that it overlaps in an axial direction on the driving arm 54. The driving arm 54 has a boss portion 54a projecting rearwardly from an end thereof such that a rear end of the boss portion 54a is positioned in flush with a rear face of the parking locking lever 56.

The link member 59 is supported at an end thereof for pivotal motion on the boss portion 54a of the driving arm 54 by a pin 60 and supported at the other end thereof for pivotal motion at an end of the parking locking lever 56 by a pin 61 thereby to connect the end of the driving arm 54 and the end of the parking locking lever 56 to each other.

Meanwhile, the left side extension 56L of the parking locking lever 56, which extends leftwardly from the first bolt 52, is shorter than the right side extension 56R. A pawl 56a projects from an end portion of the left side extension 56L toward the output power shaft 24. A parking gear wheel 65 is fitted integrally on the output power shaft 24 such that, if the pawl 56a of the parking locking lever 56 is meshed with teeth 65a of the parking gear wheel 65, then rotation of the output power shaft 24 is inhibited. The parking locking lever 56 is biased by a torsion spring 62 in a direction in which the pawl 56a of the left side extension 56L thereof meshes with the teeth 65a of the parking gear wheel 65.

It is to be noted that the teeth 65a of the parking gear wheel 65 have a rectangular cross section, and also a groove between one and another one of the teeth 65a has a channel shape. Meanwhile, an end of the pawl 56a of the parking locking lever 56 projects with a curved face shaped such that it is fitted in a channel-shaped groove of the parking gear wheel 65 to restrict rotation of the output power shaft 24 with certainty whereas it can be removed readily from the groove.

A velocity sensor 70 in the form of a magnetic detector is disposed in the proximity of the teeth 65a of the parking gear wheel 65 such that it can detect the teeth 65a revolving in the proximity of a detection portion of the velocity sensor 70 to detect the velocity of the vehicle based on rotation of the output power shaft 24.

While the output power shaft 24 is positioned in an overlapping relationship with the circle 39b of the maximum diameter of pivotal motion of the sectoral gear shift arm 39, which pivots around the shift spindle 38, the output power shaft 24 is disposed at a position in the proximity of the shift spindle 38. In particular, the output power shaft 24 is disposed such that the teeth 65a of the parking gear wheel 65 approach, or are closely adjacent to, the shift spindle 38 as seen in FIG. 4. Accordingly, the parking lock mechanism 50 is compactly incorporated in the shift change mechanism 30, and this contributes to miniaturization of the internal combustion engine 10.

The parking lock mechanism 50 is configured in such a manner as described above and is formed as a unit in such a manner that it is held by the parking lock holder 51. In particular, the driving arm 54 and the parking locking lever 56 extend through and are held by the parking lock holder 51 so as to form a unit in a state wherein the driving arm 54 fitted on the rear end spindle 38b of the shift spindle 38 and the parking locking lever 56 supported for rotation on the first bolt 52 are connected to each other by the link member 59.

The parking lock mechanism 50, retained by and forming a unit together with the parking lock holder 51 in this manner, is fitted at the rear end spindle 38b thereof with the body spindle 38a fitted in advance with the gear shift arm 39 at a predetermined position of the crankcase 12, and is fastened by the first bolt 52 and the second bolt 53 attached already. Accordingly, the parking lock mechanism 50 is superior in assemblage performance.

The parking lock mechanism 50 is assembled in such a manner that it is incorporated in the shift change mechanism 30 as described above. In the parking lock mechanism 50, upon rotation of the shift spindle 38, which is the upstream side of the power transmission system of the shift change mechanism 30, the driving arm 54 is pivoted. As a result, the parking locking lever 56 is rocked through the link member 59. Consequently, the pawl 56a of the left side extension 56L of the parking locking lever 56 is brought into or out of meshing engagement with the teeth 65a of the parking gear wheel 65 of the output power shaft 24.

Figure 8A:
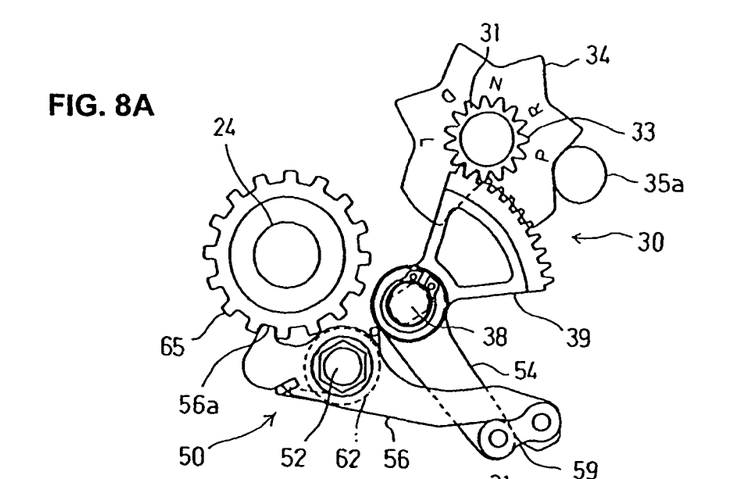
FIG. 8A is an explanatory view of the inventive shift change mechanism and a parking lock mechanism illustrating the shift state of the shift change mechanism and the parking lock mechanism corresponding to a parked position of the gear selecting apparatus.

FIGS. 8A-8E illustrate shift states of the transmission 20 in order from the parking position. FIG. 8A illustrates a state wherein the shift lever 9 is operated to pivot to the parking position P in order to set the shift state to the parking position P (same as FIG. 4).

The shift spindle 38 is positioned at an angular position corresponding to a maximum position in the clockwise direction as viewed in rear elevation, and the shift change mechanism 30 is set to the parking position P. Further, the parking locking lever 56 of the parking lock mechanism 50 is positioned at an angular position pivoted most in the clockwise direction, in which the pawl 56a of the left side extension 56L meshes with the teeth 65a of the parking gear wheel 65 of the output power shaft 24 to inhibit rotation of the output power shaft 24.

Figure 8B:
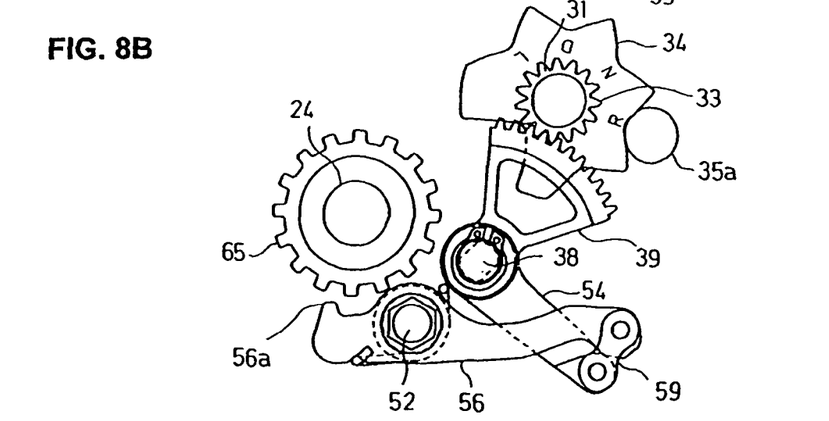
FIG. 8B is an explanatory view of the inventive shift change mechanism and a parking lock mechanism illustrating the shift state of the shift change mechanism and the parking lock mechanism corresponding to a reverse position of the gear selecting apparatus.

Then, if the shift lever 9 is operated to pivot rearwardly to the reverse position R, then the shift spindle 38 is rotated in the counterclockwise direction as seen in FIG. 8B and the shift change mechanism 30 sets its shift state to the reverse position R. Consequently, by means of the driving arm 54, which is pivoted in the counterclockwise direction together with the shift spindle 38, the parking locking lever 56 is pivoted in the counterclockwise direction through the link member 59 until the pawl 56a of the left side extension 56L is removed from a groove between a tooth 65a and an adjacent tooth 65a of the parking gear wheel 65, whereby free rotation of the output power shaft 24 is permitted.

At the parking position P, depending upon the angular position of the output power shaft 24, the pawl 56a of the left side extension 56L of the parking locking lever 56 may be meshed firmly with the teeth 65a of the parking gear wheel 65 of the output power shaft 24 such that, when a shift change to the reverse position R is performed, the pawl 56a may not be removed readily from the groove between a tooth 65a and an adjacent tooth 65a of the parking gear wheel 65. However, in the disclosed embodiment, the parking locking lever 56 is configured such that the pin 61, which serves as a power point, is positioned at an end portion of the elongated right side extension 56R with respect to the first bolt 52, serving as a fulcrum, and the pawl 56a, which serves as a point of action, is positioned at an end portion of the shorter left side extension 56L. Hence the distance from the fulcrum to the point of action is much shorter than the distance from the fulcrum to the power point, and a doubled acting force acts upon the pawl 56a in accordance with the principle of the lever. Consequently, the pawl 56a is readily removed from the groove between a tooth 65a and an adjacent tooth 65a of the parking gear wheel 65.

Since the parking lock mechanism 50 has a link structure which makes use of the principle of the lever, it is reduced in size and can be incorporated in the shift change mechanism 30 without occupying a great space.

Figure 8C:
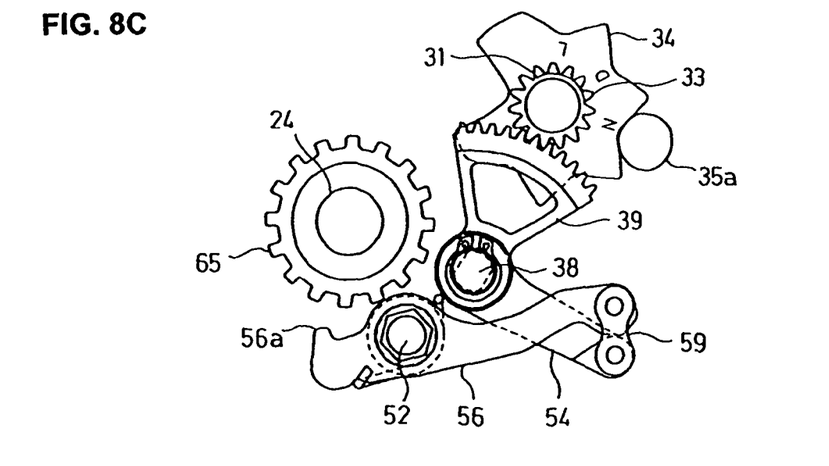
FIG. 8C is an explanatory view of the inventive shift change mechanism and a parking lock mechanism illustrating the shift state of the shift change mechanism and the parking lock mechanism corresponding to a neutral position of the gear selecting apparatus.

As shown in FIG. 8C, if the shift lever 9 is further operated to pivot rearwardly to the neutral position N, then the shift spindle 38 is further rotated in the counterclockwise direction. Consequently, the shift change mechanism 30 sets its shift state to the neutral position N, and also the parking locking lever 56 is further rocked in the counterclockwise direction, whereupon the pawl 56a of the left side extension 56L is removed from the teeth 65a of the parking gear wheel 65, whereby free rotation of the output power shaft 24 is permitted.

Figure 8D:
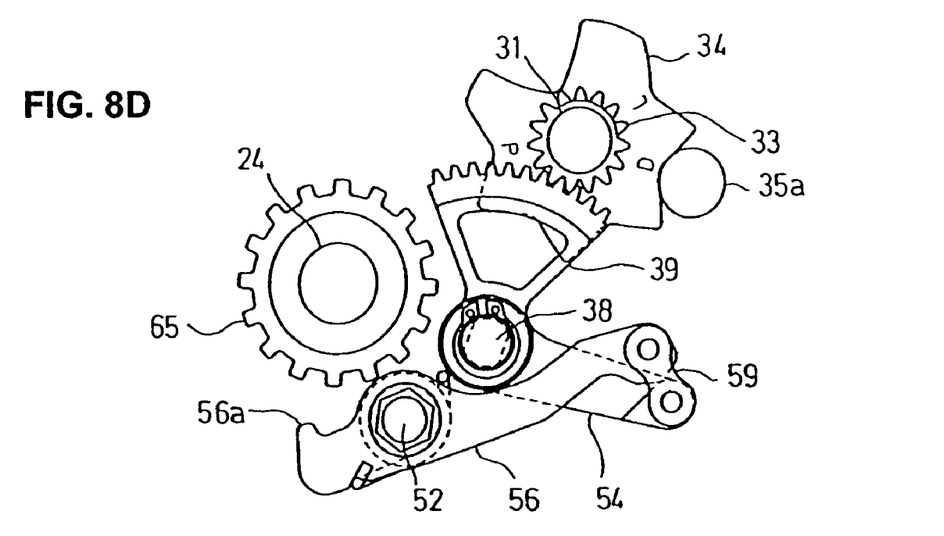
FIG. 8D is an explanatory view of the inventive shift change mechanism and a parking lock mechanism illustrating the shift state of the shift change mechanism and the parking lock mechanism corresponding to a drive position of the gear selecting apparatus.
Figure 8E:
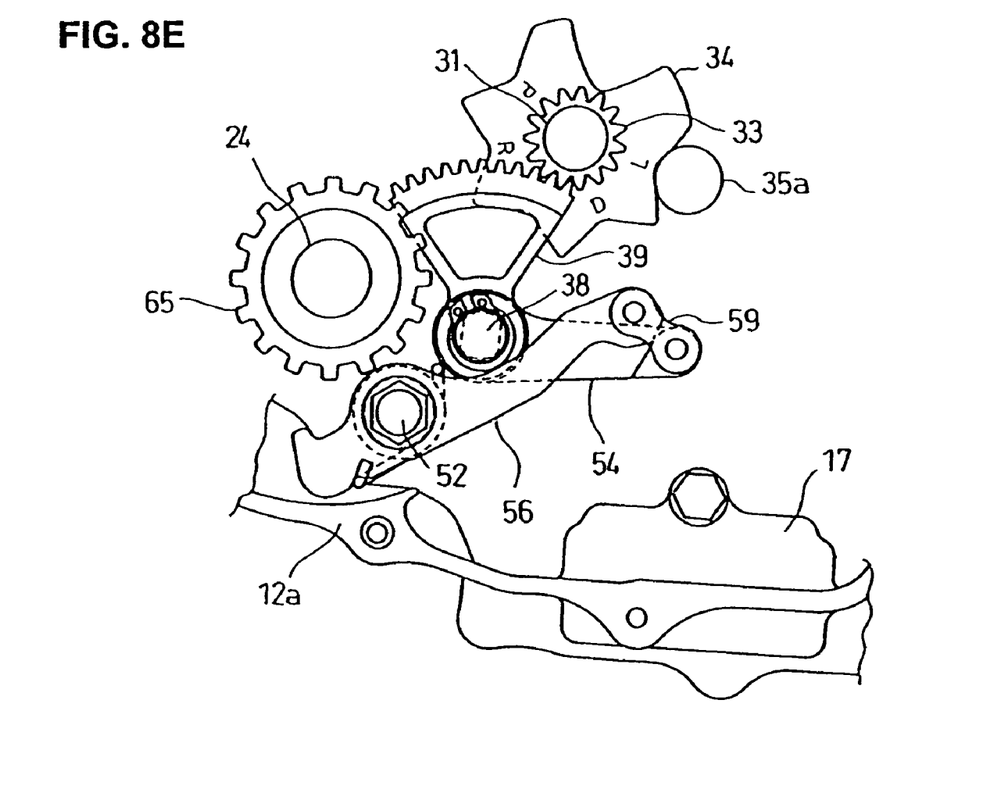
FIG. 8E is an explanatory view of the inventive shift change mechanism and a parking lock mechanism illustrating the shift state of the shift change mechanism and the parking lock mechanism corresponding to a low position of the gear selecting apparatus.

A state wherein the shift lever 9 is further pivoted to the drive position D is illustrated in FIG. 8D, and a state wherein the shift lever 9 is further pivoted to the low position L is illustrated in FIG. 8E. Since the parking locking lever 56 is further rocked in the counterclockwise direction, the pawl 56a of the left side extension 56L is further spaced away from the teeth 65a of the parking gear wheel 65 and the output power shaft 24 can rotate freely.

It is to be noted that, in a state wherein the parking locking lever 56 is rocked to the utmost in the counterclockwise direction as seen in FIG. 8E at the low position L, the parking locking lever 56 is positioned closely to but does not interfere with the mating face 12a of the crankcase 12.

In this manner, when the shift change mechanism 30 is shifted and set to the parking position P, the pawl 56a of the left side extension 56L of the parking locking lever 56 meshes with the teeth 65a of the parking gear wheel 65 to inhibit rotation of the output power shaft 24. However, when the shift change mechanism 30 is set to any position other than the parking position P, the pawl 56a of the left side extension 56L of the parking locking lever 56 is spaced away from the teeth 65a of the parking gear wheel 65 and the output power shaft 24 can rotate freely.

As described above, since the present parking lock mechanism 50 is configured such that it is driven by rotation of the shift spindle 38 which is on the upstream side of the power transmission system of the shift change mechanism 30, the parking lock mechanism 50 is compactly incorporated in the shift change mechanism 30 without requiring operation means, an actuator and so forth for exclusive use for parking locking. Consequently, miniaturization of the internal combustion engine is achieved.

Further, since the parking lock mechanism 50 has a link structure which makes use of the principle of the lever, it is reduced in size, and further miniaturization of the internal combustion engine is anticipated. Still further, engagement and disengagement (removal) of the pawl 56a of the parking locking lever 56 of the parking lock mechanism 50 with and from the teeth 65a of the parking gear wheel 65 of the output power shaft 24 is smoothly performed.

The oil strainer 17 is provided at an inlet port for absorbing oil accumulated on the bottom of the crankcase 12, and is disposed below the parking lock mechanism 50 as shown in FIG. 3. However, the oil strainer 17 is formed on the inner side with respect to the mating face 12a of the rear crankcase 12 member with the rear crankcase cover (not shown) as described hereinabove, and the oil strainer 17 does not interfere with the driving arm 54 or the parking locking lever 56 which are positioned on the outer side (rear side) with respect to the mating face 12a as seen in FIG. 5.

Only if the shift lever 9 is operated to pivot to the parking position P, the parking lock mechanism operates to inhibit rotation of the output power shaft 24 of the transmission 20 thereby to set parking locking. Consequently, the operation is simplified and convenient, and the operability thereof is good.

The gear shift arm 39 fitted on the shift spindle 38 of the shift change mechanism 30 has a sectoral shape, and the output power shaft 24 is disposed outside the range of pivotal motion of the gear shift arm 39. In addition, the shift spindle 38 and the output power shaft 24 are disposed near to each other. Consequently, the parking lock mechanism 50 is compactly incorporated.

Further, since the shift spindle 38, the drum shaft 31 of the shift drum 32 and the output power shaft 24 are disposed in the proximity of each other at the vertices of a triangle as seen in a rear view of the engine 10, the shift change mechanism 30 is compactly formed.

As described hereinabove, the rear end spindle 38b of the shift spindle 38 is formed as a separate removable member to form the parking lock mechanism 50 into a unit. Therefore, the assemblage performance of the parking lock mechanism 50 is enhanced.

While a working example of the present invention has been described above, the present invention is not limited to the working example described above, but various design alterations may be carried out without departing from the present invention as set forth in the claims.

What is claimed is:

1. A transmission for use in conjunction with an internal combustion engine,
   the transmission comprising:
      a rotary shaft,
      a gear selection device,
      a shift change mechanism operably connected to the gear selection device to perform a shift change, including movement to a parking position,
      a parking lock mechanism configured to lock the rotary shaft when the gear selection device is set to the parking position, and
      a pivotally supported working portion interconnecting the shift change mechanism and the parking lock mechanism such that the rotary shaft is disposed outside a range of pivotal motion of the working portion, and within a maximum diameter of the pivotal motion of the working portion.

2. The transmission for the internal combustion engine according to claim 1, wherein the working portion includes an elongated spindle, a sectoral gear attached to a first end of the spindle, and a power arm attached to a second end of the spindle, wherein the sectoral gear is meshed with the shift change mechanism and the power arm is operably connected to a lever arm of the locking mechanism.

3. The transmission for the internal combustion engine according to claim 1, wherein
   said rotary shaft comprises an output power shaft,
   said working portion of said shift change mechanism comprises a gear shift arm fitted on a shift spindle which is rotated by the operation of said gear selection device, and
   the shift change mechanism further comprises a shift drum which meshes with and is rotated by said gear shift arm thereby to perform the shift change, and wherein
   said parking lock mechanism is driven in an interlocking relationship with the rotation of said shift spindle to lock said output power shaft,
   said gear shift arm forms a sectoral shape and pivots at said shift spindle, and
   said output power shaft is disposed
      outside a range of pivotal motion of said gear shift arm, and
      within a maximum diameter of the pivotal motion of said gear shift arm.

4. The transmission for the internal combustion engine according to claim 3, wherein said shift spindle, a drum shaft of said shift drum and said output power shaft are disposed in a mutually neighboring relationship so as to form vertices of a triangle.

5. The transmission for the internal combustion engine according to claim 3, wherein
   an end portion of said shift spindle is formed as a separate removable member, and
   said parking lock mechanism is connected to the end portion of said shift spindle so as to be interlocked with said shift spindle.

6. The transmission for the internal combustion engine according to claim 3, wherein the shift spindle comprises a body spindle portion and a rear end spindle portion which is a separate member from the body spindle portion,
   and wherein the body spindle portion and rear end spindle portion are connected so as to rotate coaxially and integrally with each other.

7. The transmission for the internal combustion engine according to claim 1, wherein
   said rotary shaft comprises an output power shaft,
   said working portion of said shift change mechanism comprises a gear shift arm fitted on a shift spindle which is rotated by the operation of said gear selection device, and
   the shift change mechanism further comprises a shift drum which meshes with and is rotated by said gear shift arm thereby to perform the shift change, and wherein
   said parking lock mechanism comprises:
      a parking lock holder secured to an engine housing via a bolt and configured to receive the shift spindle therethrough;
      a locking lever extending transversely to an axis of the shift spindle, the locking lever comprising a first end formed into a pawl, and a second end opposed to the first end, the locking lever pivotable about said bolt at a fulcrum location between said first and second ends thereof;
      a driving arm connected at a first end to the shift spindle; and
      a link member connecting a second end of the driving arm to the second end of the locking lever,
      such that when the shift spindle is rotated in a first direction to a maximum extent of the gear shift arm, the locking lever is rotated such that the pawl engages with the output power shaft so as to prevent rotation of the output power shaft, and when the shift spindle is rotated in a second direction, the pawl disengages from the output power shaft so as to permit free rotation of the output power shaft.

8. A vehicle having the transmission of claim 1 installed therein.

9. The vehicle of claim 8, wherein the vehicle is an all-terrain vehicle.

10. A transmission for an internal combustion engine,
    the transmission comprising:
       an output power shaft,
       a gear selection device,
       a shift change mechanism operably connected to the gear selection device to perform a shift change, including movement to a parking position,
       a parking lock mechanism configured to lock the output power shaft when the gear selection device is set to the parking position, and
       a working portion axially interconnecting the shift change mechanism and the parking lock mechanism, wherein the working portion spaces the parking lock mechanism apart from the shift change mechanism in a longitudinal axis direction of the working portion, and wherein the working portion includes an elongated and axially rotatable shift spindle, a sectoral gear attached to a first end of the spindle, and a power arm attached to a second end of the shift spindle, wherein the sectoral gear is meshed with the shift change mechanism and the power arm is operably connected to a lever arm of the locking mechanism.

11. The transmission for the internal combustion engine according to claim 10, wherein
said output power shaft is disposed
outside a range of pivotal motion of said sectoral gear, and
within a maximum diameter of the pivotal motion of said sectoral gear.

12. The transmission for the internal combustion engine according to claim 11, wherein said shift spindle, a drum shaft of said shift change mechanism and said output power shaft are disposed in a mutually neighboring relationship so as to form vertices of a triangle.

13. The transmission for the internal combustion engine according to claim 11, wherein
an end portion of said shift spindle is formed as a separate removable member, and
said parking lock mechanism is connected to the end portion of said shift spindle so as to be interlocked with said shaft spindle.

14. A vehicle having the transmission of claim 10 installed therein.

15. The vehicle of claim 14, wherein the vehicle is an all-terrain vehicle.

16. A transmission for use in conjunction with an internal combustion engine,
the transmission comprising:
a rotary shaft,
a gear selection device,
a shift change mechanism operably connected to the gear selection device to perform a shift change, including movement to a parking position,
a pivotally supported parking lock lever having a lever arm on a first end and a locking element disposed on a second end with a pivot point disposed between the first and second end, and
a working portion connecting the shift change mechanism to the lever arm of the parking lock lever, wherein the locking element of the parking lock lever is configured to lock the rotary shaft when the gear selection device is set to the parking position, and wherein the working portion includes a shift spindle with a shift arm pivotally fitted thereto and meshed with the shift change mechanism, and wherein the rotary shaft is disposed outside a range of pivotal motion of the shift arm, and within a maximum diameter of the pivotal motion of the shift arm.

17. The transmission for the internal combustion engine according to claim 16, wherein the distance between the lever arm and the pivot point is greater than the distance between the pivot point and the locking element.

18. A vehicle having the transmission of claim 16 installed therein.

* * * * *